July 5, 1960  K. R. DANIEL ET AL  2,943,335
ELECTRICALLY OPERATED PNEUMATIC APPARATUS FOR
AUTOMATICALLY ASSEMBLING NUTS AND BOLTS
Filed March 13, 1956  9 Sheets-Sheet 5
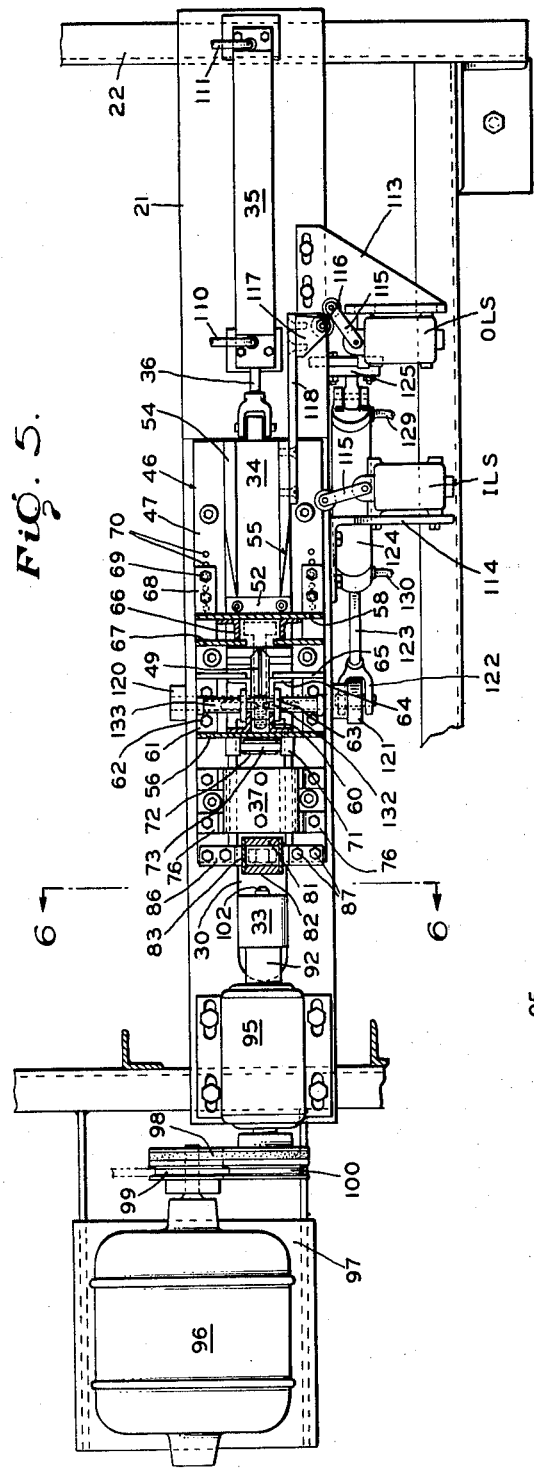
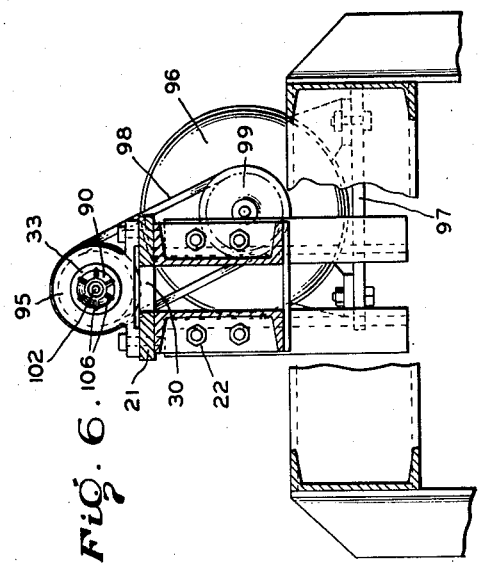
INVENTORS
KENNETH R. DANIEL
CARL P. FARLOW, JR.
JAMES C. LOWERY
JAMES O. PATTON, JR.
BY
Cameron, Kerkam & Sutton
ATTORNEYS

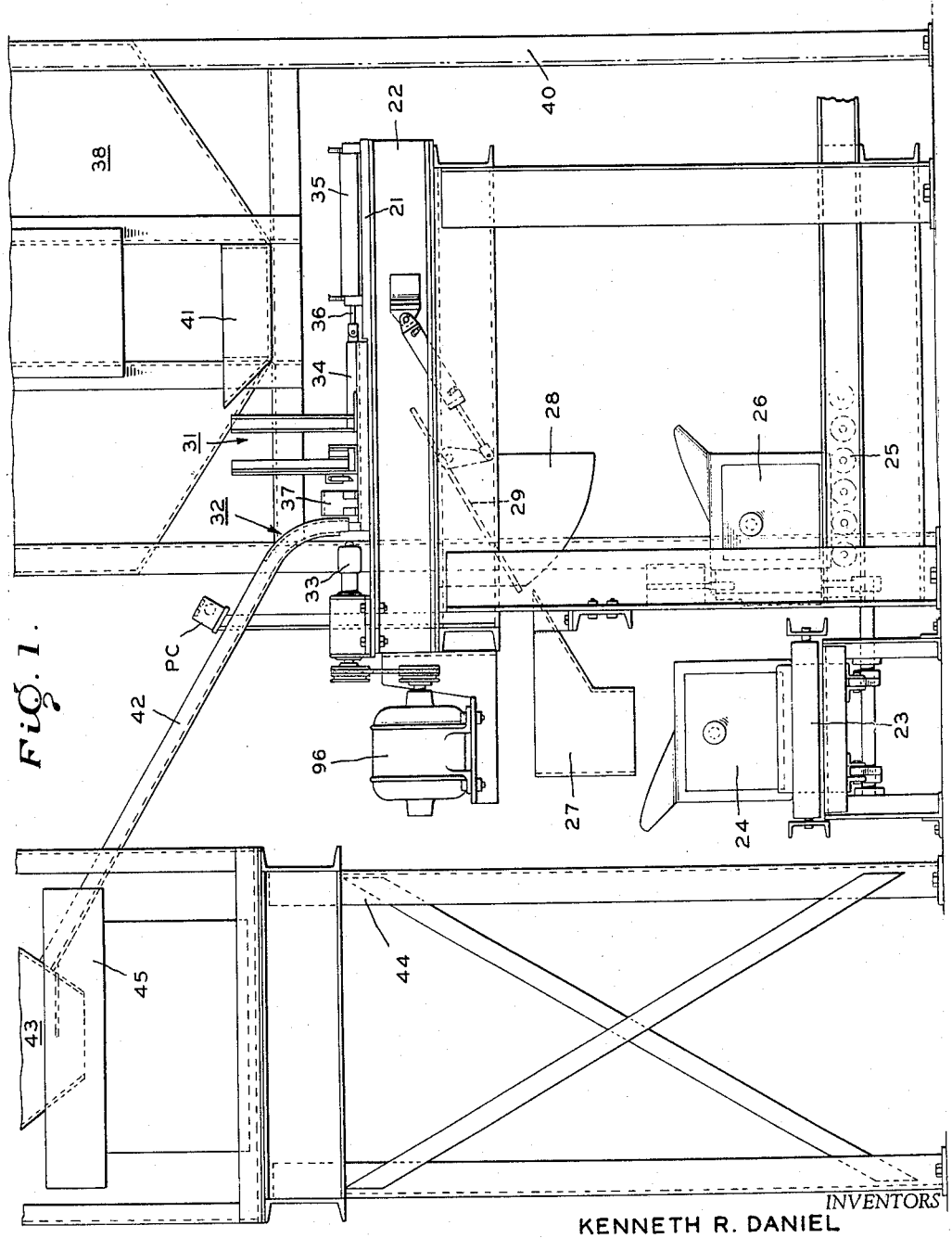
INVENTORS
KENNETH R. DANIEL
CARL P. FARLOW, JR.
JAMES C. LOWERY
JAMES O. PATTON, JR.
BY
Cameron, Kerkam & Sutton
ATTORNEYS

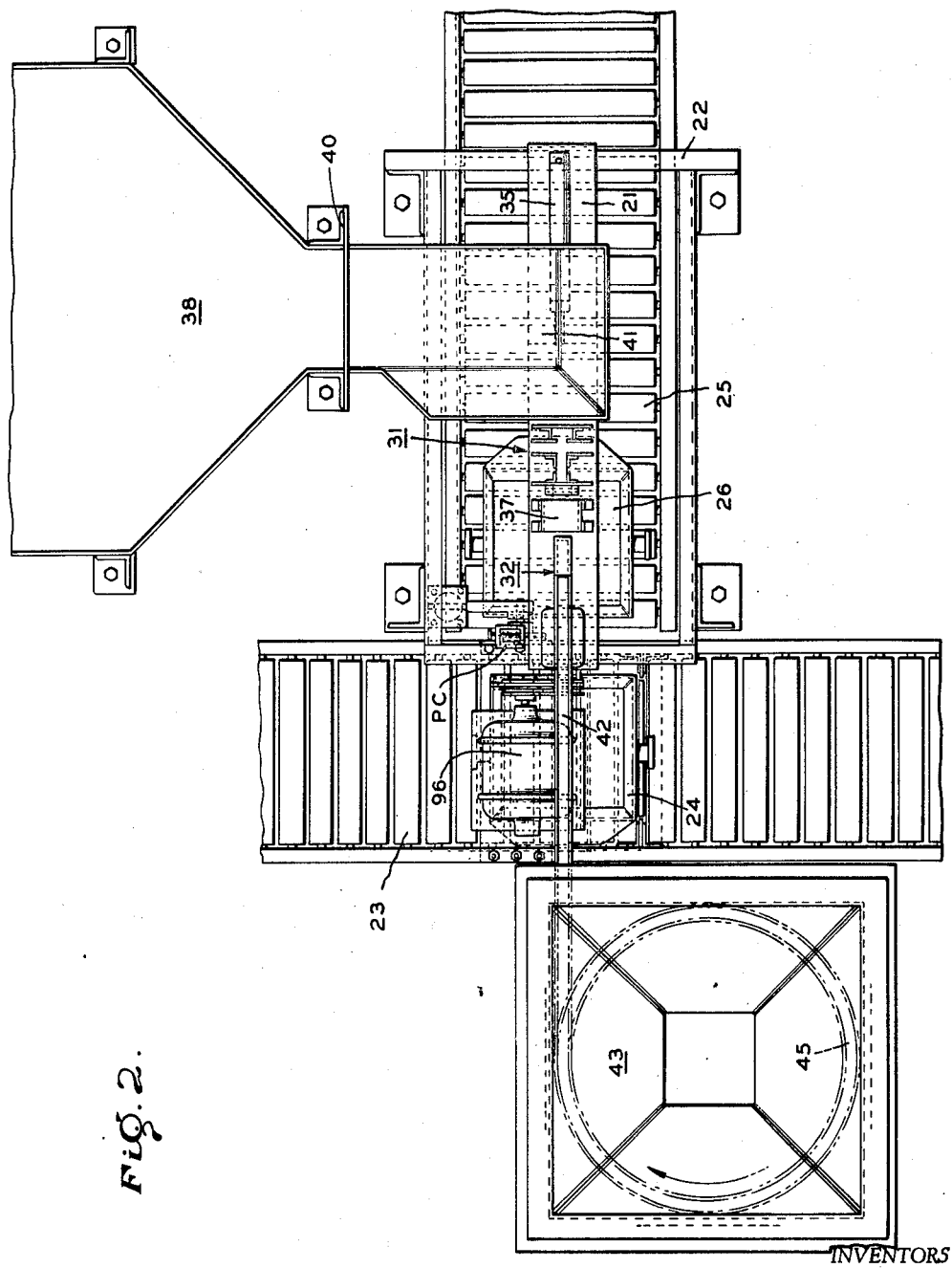

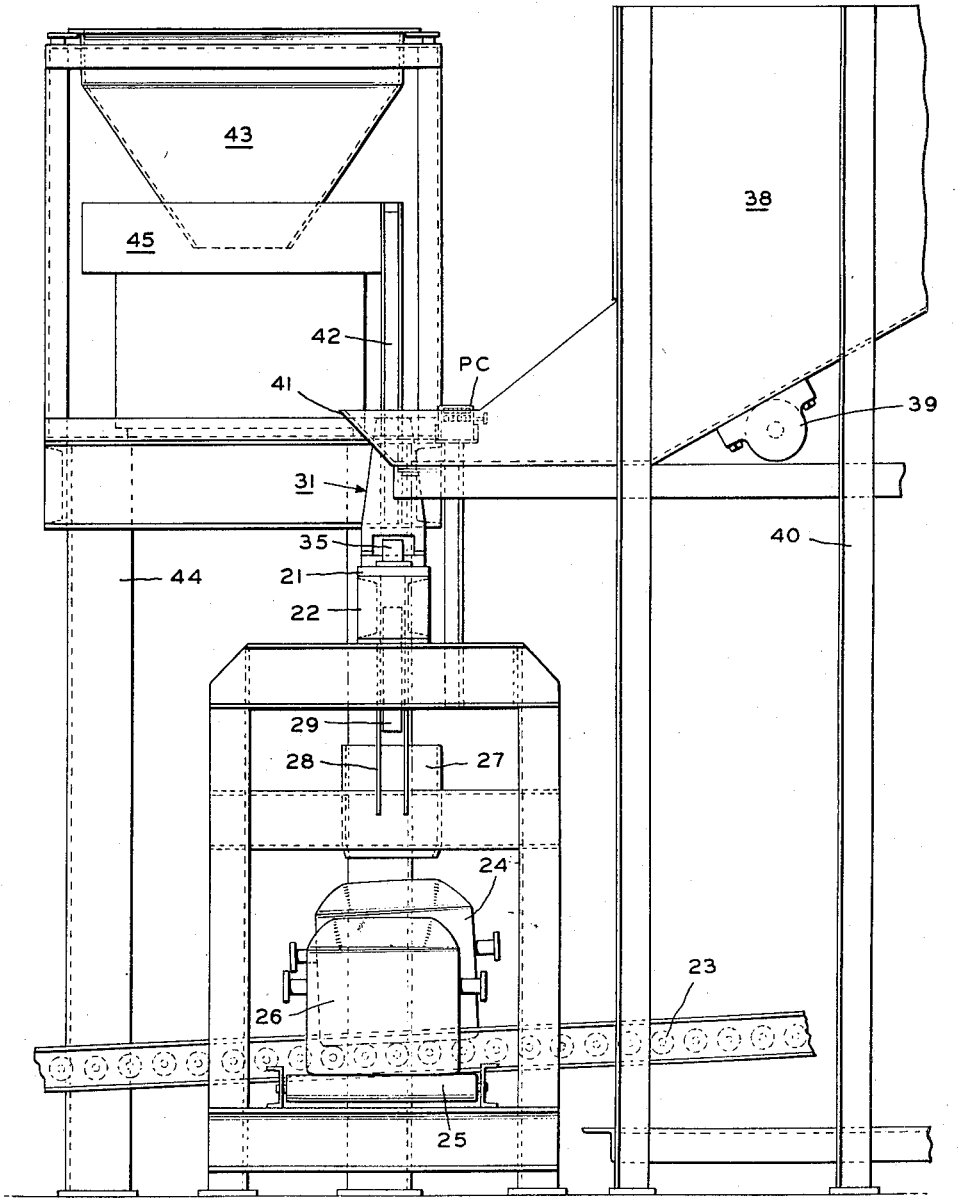

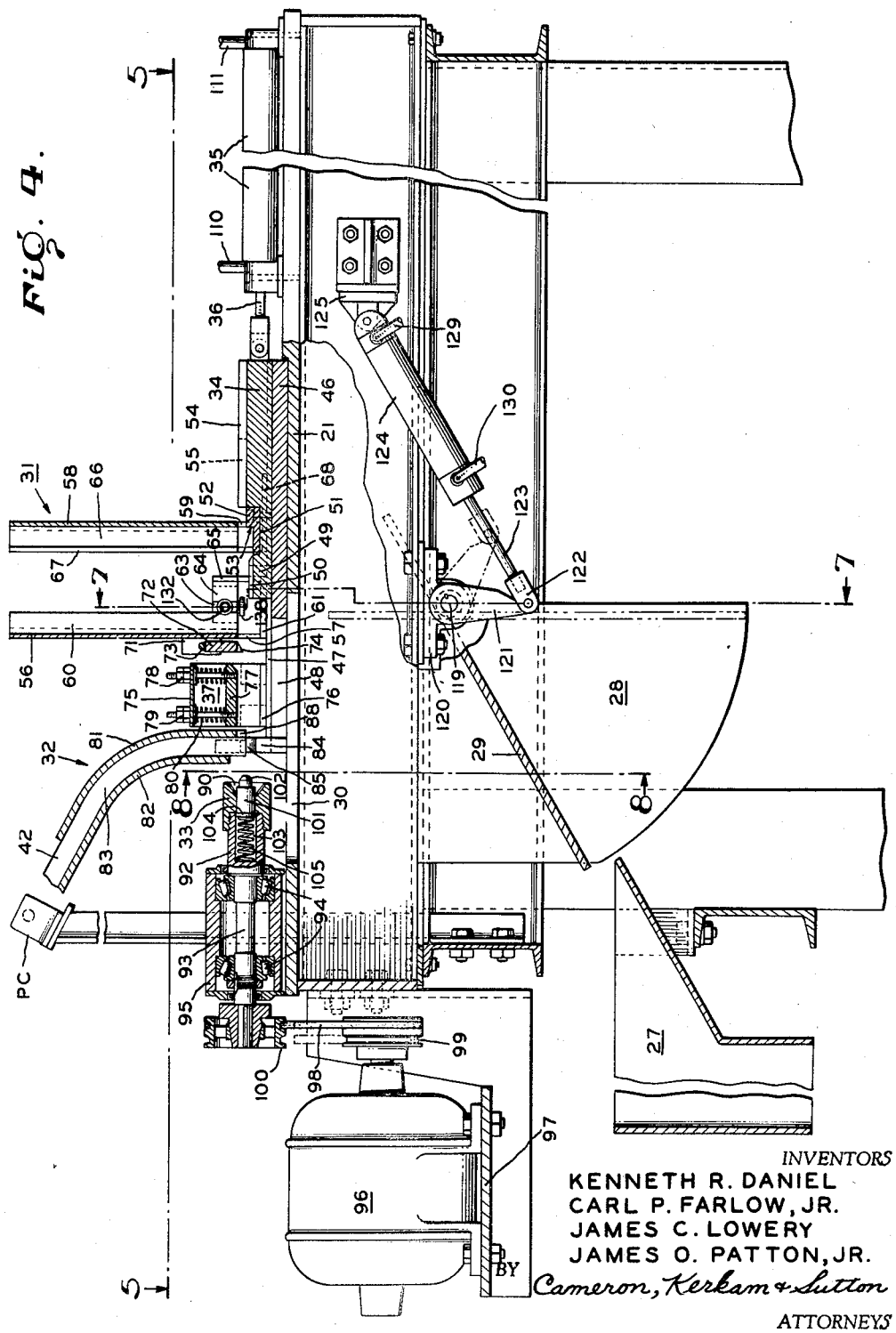

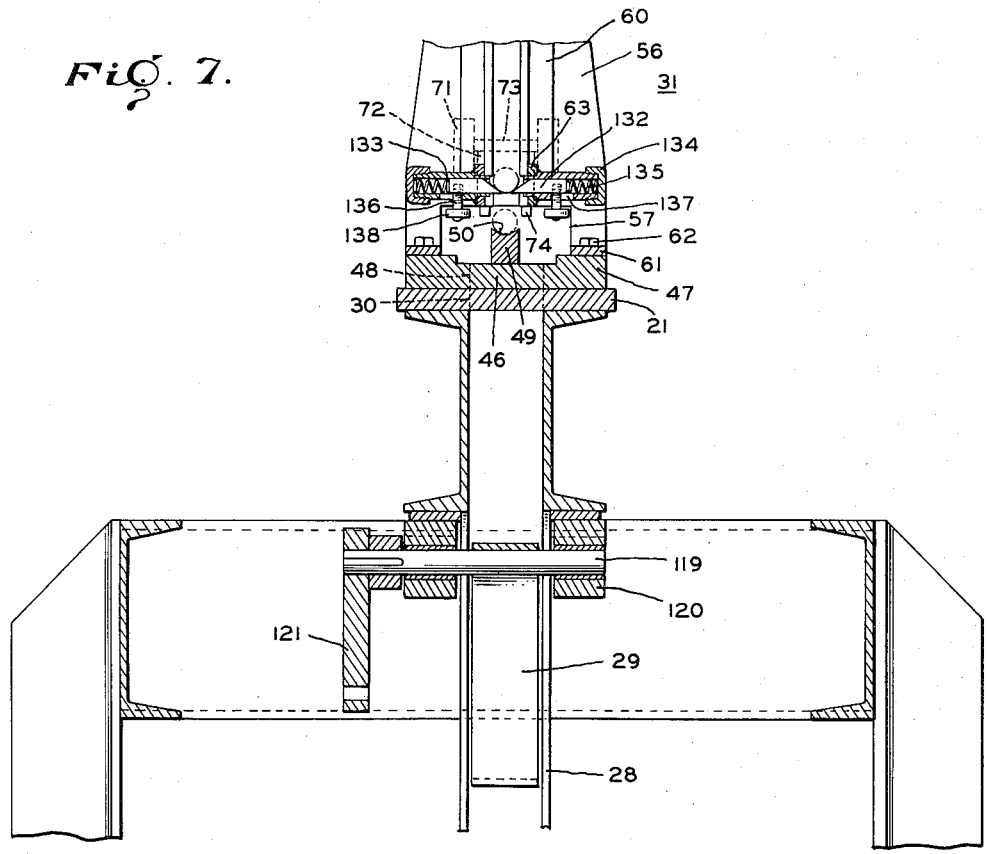
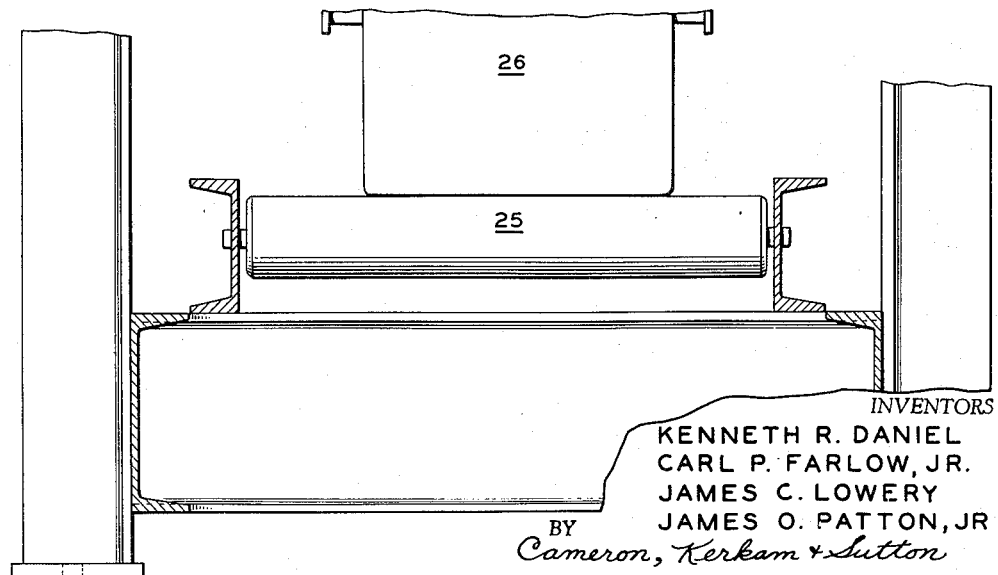

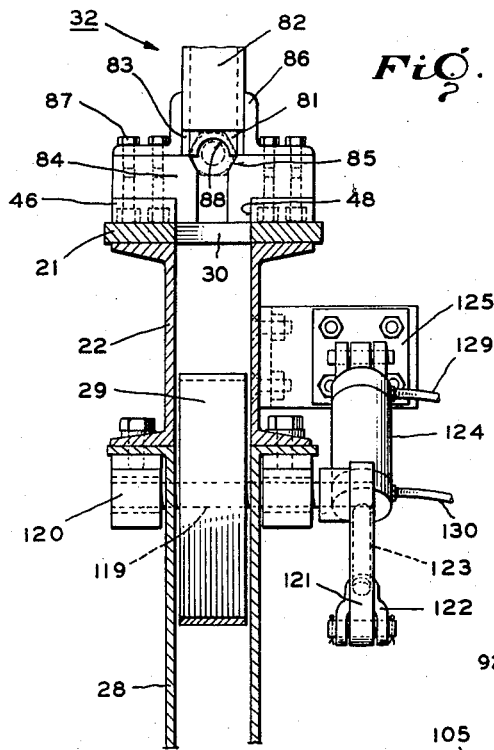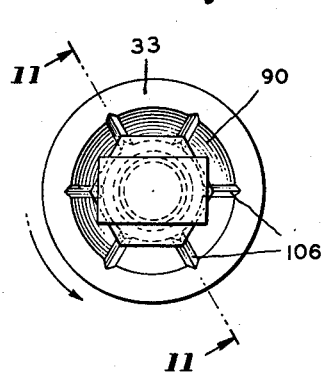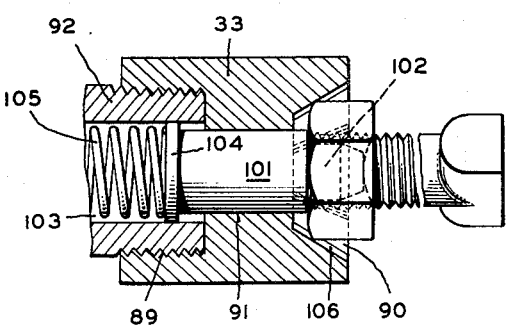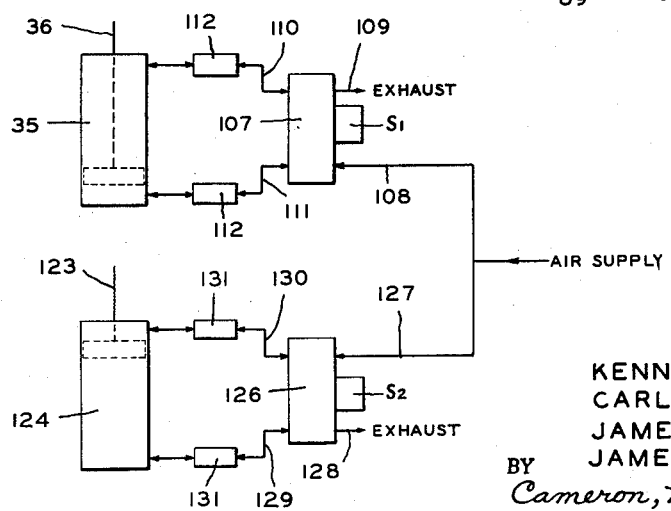

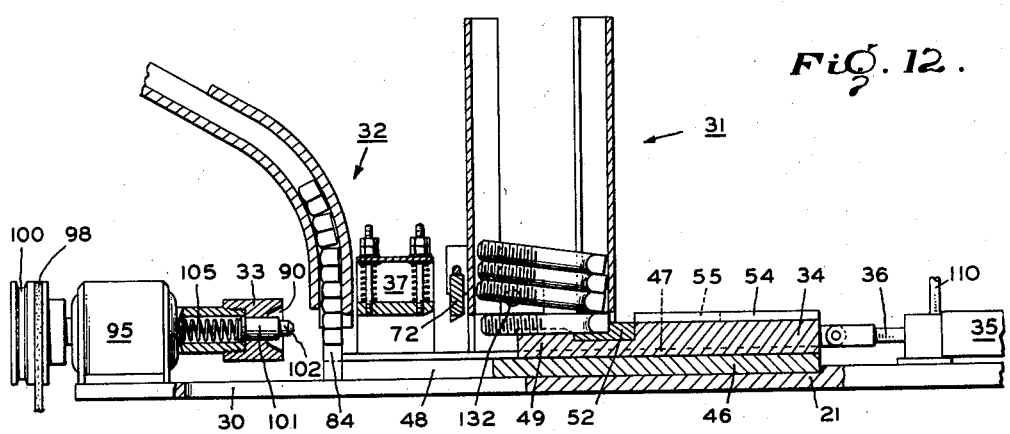
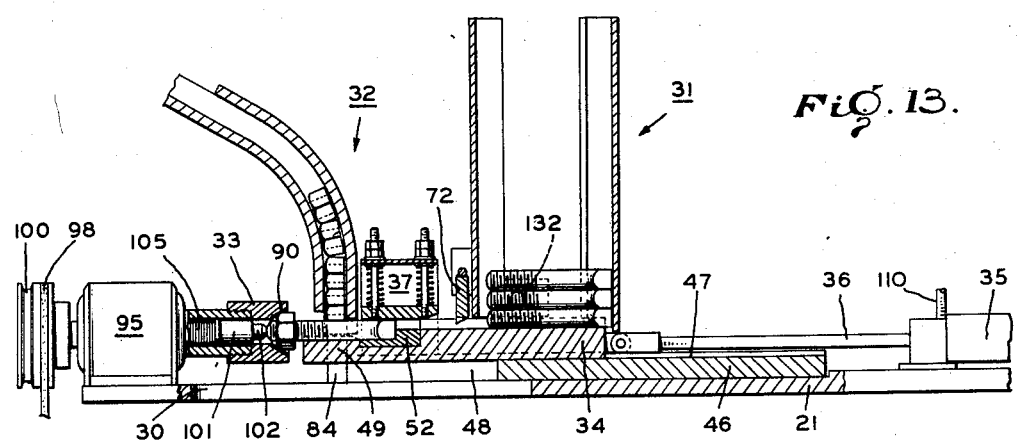
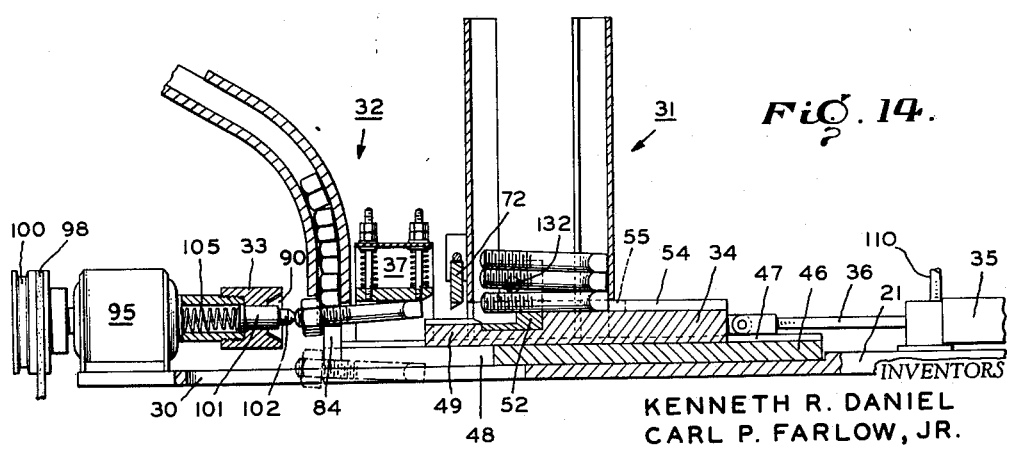

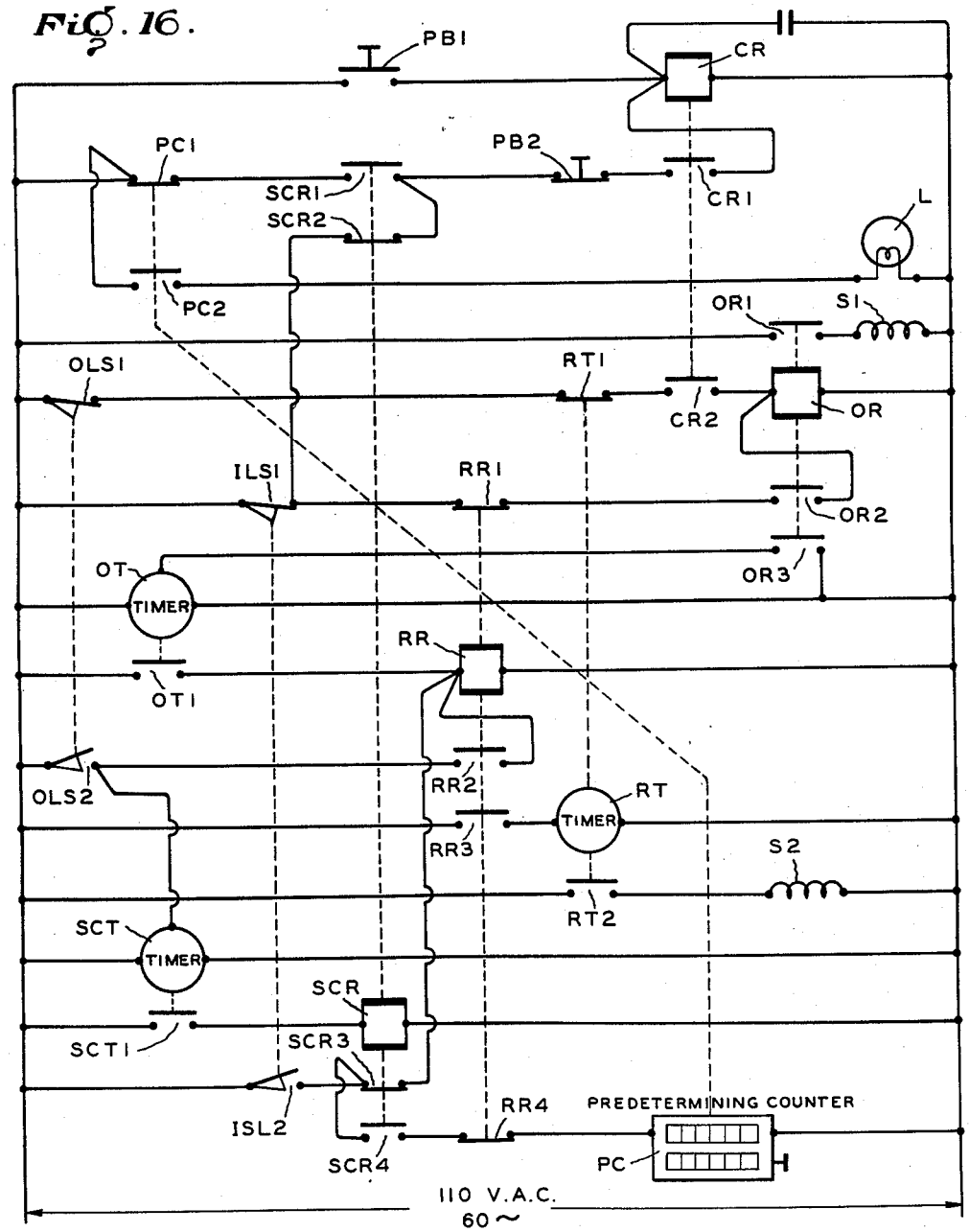

United States Patent Office 2,943,335
Patented July 5, 1960

2,943,335

ELECTRICALLY OPERATED PNEUMATIC APPARATUS FOR AUTOMATICALLY ASSEMBLING NUTS AND BOLTS

Kenneth R. Daniel, Carl P. Farlow, Jr., James C. Lowery, and James O. Patton, Jr., Birmingham, Ala., assignors to American Cast Iron Pipe Company, Birmingham, Ala., a corporation of Georgia Filed Mar. 13, 1956, Ser. No. 571,302

20 Claims. (Cl. 10—155)

This invention relates to apparatus for assembling nuts and bolts prior to shipment from their place of manufacture, and is particularly directed to the provision of bolt nutting machinery of the automatic type wherein the only manual operation required while the machine is in use is the delivery of nuts and bolts to the bins or hoppers from which they are fed to the assembling mechanism.

One of the principal objects of the present invention is to provide an apparatus of relatively simple mechanical construction, embodying a minimum of moving parts, which is capable of high-speed automatic assembly of nuts and bolts.

Another object is the provision of new and improved mechanism for threading nuts onto bolts which automatically separates defective assemblies or unassembled nuts and bolts from those which have been properly assembled, and which counts the properly threaded assemblies only and automatically stops itself after a predetermined number of such assemblies have been made.

A further object of the invention is to provide a novel electro-pneumatic system for automatically controlling the operating functions of bolt nutting apparatus of the character described which is also operative to stop the machine in the event that the supply of either nuts or bolts becomes exhausted.

Still another object is to provide a device for automatically assembling nuts and bolts wherein the bolts act as carriers for the nuts during their transfer to the assembling mechanism, and the distance to which the nuts are threaded onto the bolts is automatically controlled.

These and other objects, including the provision of improved means for properly positioning the nuts and bolts for assembly and for preventing cross-threading thereof, will appear more fully upon consideration of the detailed description of the embodiment of the invention which follows. In this connection, although only one specific form of nut and bolt assembling apparatus is described and illustrated in the accompanying drawing, it is to be expressly understood that these drawings are for purposes of illustration only and are not to be construed as defining the limits of the invention, for which latter purpose reference should be had to the appended claims.

The apparatus of the present invention comprises as its principal elements a bolt supply magazine from which bolts are fed by gravity onto a horizontally reciprocable bolt carrying slide, a nut supply magazine from which nuts are gravity fed to a support whereon each nut is held with its threaded bore in axial alignment with the horizontally extending threaded shank of the bolt on the slide, and a rotatable nut spinning chuck adapted to engage the nut and turn it onto the bolt while the latter is non-rotatably held on the slide and the slide is moved forwardly toward the chuck. The speed of movement of the slide is such that engagement of the threaded end of the bolt with the nut is effective to push the nut off its support into the chuck and onto the reduced end of a spring loaded centering pin which is adapted to enter the bore of the nut so as to properly position the nut in the chuck and also hold the nut in axial alignment with the bolt as the threading operation starts, whereby cross-threading is prevented.

The movement of the bolt slide is controlled by electro-pneumatic means so arranged that, when the bolt has been threaded onto the nut a predetermined distance, which distance can be varied as desired, the slide is reversed and carries the assembled nut and bolt with it away from the chuck until abutment of the nut on the bolt against the next nut to be assembled, which has then dropped onto the nut support, stops the rearward movement of the nut and bolt assembly and causes it to drop out of the machine into a suitable collecting receptacle as the bolt slide continues to move and slides out from under the assembly. When the slide reaches the limit of its rearward movement, it receives another bolt from the magazine and the control system again reverses its direction of movement so as to repeat the assembling operation.

The present invention also provides electrically controlled, pneumatically actuated means which detect either a failure of the nut and bolt to assemble at all or an improper assembly, as might occur in the case of a defectively threaded nut or bolt, and automatically reject unassembled nuts and bolts or defective assemblies by diverting them into a collection receptacle separate from that which receives the properly assembled units. The control system is so arranged as to automatically stop reciprocation of the bolt slide should either the nut magazine or the bolt magazine become empty, and also includes an electrically actuated meter which counts the properly assembled nuts and bolts and is settable to stop the machine after a predetermined number of such assemblies have been made.

In the drawings, wherein like reference characters indicate like parts throughout the several views:

Fig. 1 is a side elevation showing the general arrangement of the principal elements of one form of bolt nutting apparatus embodying the present invention;

Figs. 2 and 3 are a plan view and an end elevation looking from the right in Fig. 1, respectively, of the apparatus shown in Fig. 1;

Fig. 4 is an enlarged side view of the nut and bolt assembling mechanism of Figs. 1–3, partially in section along the longitudinal central plane of said mechanism;

Fig. 5 is a plan view corresponding to Fig. 4 taken substantially from the plane 5—5 in the latter figure and omitting portions of the machine framework;

Figs. 6, 7 and 8 are transverse vertical sectional views taken substantially on the planes 6—6, 7—7 and 8—8, respectively, in Figs. 4 and 5;

Fig. 9 is an enlarged perspective view of the bolt carrying slide of the illustrated embodiment of the present invention;

Figs. 10 and 11 are an enlarged end view and an axial section taken substantially on the plane 11—11 in Fig. 10, respectively, of the nut spinning chuck, including a showing of a bolt and a nut in the positions occupied thereby when the chuck first grips the nut and starts to thread it onto the threaded end of the bolt;

Figs. 12, 13 and 14 are fragmentary, partially sectioned side views, similar to Fig. 4, showing the relative positions of the parts at the beginning of the bolt nutting cycle, just before the bolt carrying slide starts its forward movement (Fig. 12), when the bolt slide reaches the limit of its forward travel and the nut has been threaded onto the bolt the desired predetermined distance (Fig. 13), and when the rearward movement of the slide has withdrawn the assembled nut and bolt from the spinning chuck and brought the assembly into position for discharge from the machine (Fig. 14);

Fig. 15 is a schematic diagram of the electrically controlled, pneumatically operated elements of the apparatus shown in Figs. 1–14; and Fig. 16 is a simplified schematic diagram of the electrical circuits of the control system of the illustrated embodiment of the invention.

Referring first to the generalized showing of Figs. 1, 2 and 3, the principal elements of the nut and bolt assembling apparatus of the present invention are mounted on an elongated base plate 21 which is supported on a suitable framework 22 in an elevated position above the level of a roller conveyor 23 on which travel baskets or other receptacles 24 (only one being shown in the drawings) for collecting the nut and bolt assemblies made by the machine, and a similar conveyor 25 adapted to support a basket 26 for receiving unassembled nuts and bolts or defective assemblies which are rejected either because the nut has failed to thread onto the bolt or has become jammed or otherwise improperly threaded thereon. In the arrangement illustrated, conveyor 23 extends in a direction substantially perpendicular to the longitudinal dimension of base plate 21 and passes outside the legs of framework 22 beneath a chute 27 which is mounted on and projects outwardly from said framework and is adapted to deliver the properly assembled nuts and bolts to basket 24. Conveyor 25 extends parallel to base plate 21, between the legs of framework 22, so as to position basket 26 directly beneath a vertically extending chute 28 through which unassembled nuts and bolts and defective assemblies are permitted to drop when a baffle plate 29, normally maintained in the inclined position indicated in Fig. 1, is moved into a vertical position by means later to be described. When baffle plate 29 occupies its normal inclined position, it directs the nut and bolt assemblies which drop through an opening 30 in base plate 21 (see Fig. 4) into chute 27 and basket 24.

Mounted on base plate 21 in alignment along the longitudinal center line thereof are a bolt supply magazine 31, a nut supply magazine 32, a rotatable nut spinning chuck 33, a horizontally movable bolt slide 34 by which the bolts and nuts are carried toward and away from chuck 33, a pneumatic cylinder 35 having a piston rod 36 which is connected to and imparts reciprocating movement to bolt slide 34, and a bolt hold-down device 37 which is adapted to hold the bolts in proper position on the slide and prevent them from rotating as the nuts are threaded thereon by chuck 33 in the manner hereinafter described.

Magazines 31 and 32 may be supplied with bolts and nuts in any suitable manner, either manually or mechanically, and are so constructed as to feed them to the assembling mechanism one-by-one by gravity with the bolts in a horizontal position and the nuts on edge with their threaded bores in alignment with the threaded shanks of the bolts. In the embodiment shown, a bolt bin 38 having an inclined bottom wall fitted with a vibrating device 39 of any suitable character is mounted on a framework 40 adjacent the upper end of bolt supply magazine 31, and delivers the bolts to an open topped tray 41 from which they are manually loaded into the magazine. The nuts are supplied to nut magazine 32 through an inclined, open topped chute 42 from an elevated bin 43 mounted on a framework 44, the nuts being delivered into the upper end of chute 42 in any suitable manner, as by means of a rotatable parts feeder 45 of the type manufactured by the Syntron Company under Model No. EB-23.

Turning now to Figs. 4–14 which illustrate the nut and bolt assembling mechanism in greater detail than Figs. 1–3, it will be seen that the portion of base plate 21 forward of pneumatic cylinder 35 is of reduced height and has fixed thereto a bolt slide guide 46 adapted to support bolt slide 34 and having raised marginal portions 47 which guide the slide as it is moved forwardly and rearwardly by cylinder 35 and piston rod 36. The forward end of slide guide 46 is provided with an elongated centrally positioned opening 48 which overlies the discharge opening 30 in base plate 21.

The main body portion of bolt slide 34 is of such width as to have a sliding fit between the raised marginal portions 47 of slide guide 46, and has a forwardly extending tongue portion 49 of reduced width, substantially equal to the diameter of the bolts which the apparatus is intended to handle. The upper surface of tongue portion 49 has formed therein a substantially V-shaped groove 50 which is adapted to receive and position the shanks of the bolts as they are fed to the slide from bolt magazine 31 (see Figs. 7 and 12). Just rearwardly of tongue portion 49 the bolt slide is provided with a transversely extending recess 51 in which is removably mounted a stepped insert block 52 having a transversely extending vertical shoulder 53 adapted to abut the bolt head when the slide moves forwardly toward nut spinning chuck 33. Insert block 52 is removably mounted on the bolt slide so that it may be interchanged with similar blocks having differently positioned shoulders 53 to accommodate bolts of different lengths. The rear portion of bolt slide 34 includes a pair of upstanding ridges 54 which extend longitudinally along the edges of the slide and are tapered at their forward ends as shown in Figs. 5 and 9 so as to form cam surfaces 55 for a purpose hereinafter described.

Bolt supply magazine 31, which is so arranged as to deliver bolts to the forward end of slide 34 when the slide is in its rearmost position shown in Figs. 4, 5 and 12, comprises a front hopper section of fixed position adapted to receive and guide the threaded ends of the bolts, and a rear hopper section, adjustable in position, adapted to receive and guide the heads of the bolts which, in the embodiment illustrated, are of T-shape as indicated in Figs. 10–14 and in broken lines in Fig. 5. It will be obvious, of course, that the structure of the bolt magazine and bolt slide may be readily modified to handle any desired form of bolt head.

The front hopper section of the bolt magazine includes a plate 56 extending the full height of the magazine and the full width of bolt slide guide 46, the lower end of which plate has a centrally positioned opening 57 therein of sufficient height and width to permit the passage of bolt slide 34 therethrough. The rear hopper section includes a similar plate 58 having a similar opening 59 in the lower end thereof. Welded to the rear side of and coextensive in height with plate 56 of the front hopper section are a pair of vertical angle bars 60 the legs of which perpendicular to plate 56 are spaced apart a distance only slightly greater than the bolt diameter so as to form a guiding channel for the threaded ends of the bolts. The lower end portions of plate 56 on opposite sides of opening 57 are welded to a pair of horizontal, longitudinally extending base plates 61 by which the front hopper section is adapted to be mounted on and fixed to the marginal portions 47 of slide guide 46 with cap screws 62. The lower end of the front hopper section is also provided with a pair of relatively short longitudinally extending plates 63 welded at their forward edges to the laterally spaced legs of angle bars 60 and at their rear edges to the corresponding legs of a pair of angles 64 which are in turn welded to and supported by a pair of inverted L-shaped plates 65 fixed to base plates 61.

Plate 58 of the rear hopper section has welded to the forward side thereof a pair of vertical angle bars 66 the parallel legs of which are spaced apart by a distance slightly greater than the long dimension of the T heads of the bolts. Angle bars 66, together with a pair of plates 67 which extend parallel to plate 58 with their adjacent edges spaced apart by a distance less than that separating the parallel legs of angle bars 66, form a guiding channel for the T-shaped heads of the bolts.

Plates 58 and 67 are welded at their lower ends to a pair of horizontal, longitudinally extending base plates 68 by which the rear hopper section is adapted to be mounted on and fixed to the marginal portions 47 of slide guide 46 with cap screws 69. As indicated in Fig. 5, a plurality of sets of tapped holes 70 are provided in slide guide 46 to receive cap screws 69 so that the position of the rear hopper section may be adjusted to accommodate bolts of different lengths.

As indicated in Figs. 4 and 7, the lower ends of angle bars 60 and 66 and plates 67 are also cut away so as to avoid interference with the movement of bolt slide 34 through openings 57 and 59.

Mounted on the forward side of plate 56 of the front hopper section is a pair of brackets 71 in which an ejector member 72 is pivotally supported by means of a shaft 73 welded to its upper edge. Ejector member 72 is provided at its lower edge with a pair of lugs 74 which project downwardly below the top edge of opening 57 in plate 56 and are spaced apart a distance slightly greater than the diameter of the bolts which the slide 34 is adapted to carry. The rear surfaces of lugs 74 are beveled so that, when said surfaces are engaged by the laterally extending ends of the T head of a bolt as the bolt slide moves forwardly, ejector member 72 is caused to pivot in a clockwise direction about its shaft 73 to permit the bolt to pass. However, the front surfaces of lugs 74 are vertical so that, should a bolt remain on the slide as the latter reaches magazine 31 on its rearward movement, the lugs will engage the bolt head and, upon abutment of ejector member 72 against plate 56, prevent the bolt from continuing rearwardly with the slide, thereby ejecting it from the slide and causing it to drop through opening 48 in slide guide 46 and opening 30 in base plate 21 into reject chute 28.

Hold-down device 37, which is located between bolt magazine 31 and nut magazine 32, comprises an inverted U-shaped supporting member 75 having laterally extending legs 76 by which it is mounted on and secured to the marginal portions 47 of slide guide 46, and a hold-down plate 77 yieldably suspended within supporting member 75 by a pair of vertically extending pins 78 which are threaded at their lower ends into plate 77, pass upwardly through openings in the top of supporting member 75 and are provided at their upper ends with adjustable stop nuts 79. A pair of compression springs 80 surrounding pins 78 are interposed between the upper surface of plate 77 and the lower surface of the top of supporting member 75, and yieldably urge plate 77 to the lowermost position permitted by the location of stop nuts 79. Nuts 79 are so adjusted on pins 78 as to normally maintain hold-down plate 77 in a position to yieldably engage the upper surfaces of the bolts carried by slide 34 and thereby hold the bolts in proper position on the slide as well as prevent them from rotating while the nuts are being threaded thereon. As shown in Fig. 4, the rear edge of hold-down plate 77 is beveled to facilitate the passage therebeneath of bolts carried by slide 34.

As previously indicated, the nuts which are to be assembled with the bolts supplied from magazine 31 are delivered by gravity to nut magazine 32 through an inclined chute 42, the magazine being in effect a continuation of the chute but including an additional wall 81 forming the rear wall of the magazine and the top wall of the lower end of the chute so as to provide a complete enclosure for the nuts as they enter the magazine. The magazine also includes a front wall 82, which is a continuation of the bottom wall of chute 42, and a pair of side walls 83.

Immediately beneath the open bottom end of nut magazine 32 are a pair of nut supporting blocks 84 which are mounted on slide guide 46 at the forward ends of the portions thereof defining opening 48. The adjacent vertical sides of blocks 84 are spaced apart a distance slightly in excess of the width of tongue portion 49 of bolt slide 34, and the upper portions of said sides are beveled upwardly and outwardly at angles of 30° to the vertical so as to form a support for the lowermost nut in the magazine. As indicated in Fig. 8, the beveled supporting surfaces 85 of blocks 84 are of the same relative angularity and substantially the same area as any two alternate sides of the nut. Blocks 84 are of such height as to so support the nut that its threaded bore is in exact axial alignment with the threaded shank of the bolt carried by slide 34.

The lower end of nut magazine 32 is fixed to and supported on the upper surfaces of blocks 84 by means of angle brackets 86, which are suitably secured to side walls 83 of the magazine, and by cap screws 87. Front wall 82 of the nut magazine terminates above the lower edges of side walls 83 in a plane just above that of the uppermost side of the lowermost nut in the magazine when said nut is supported on blocks 84, as shown in Fig. 8, so as to avoid interference with the nut when it is moved forwardly into spinning chuck 33 in a manner later to be described. Rear wall 81 of the magazine extends downwardly at its edges to the plane of the upper surface of blocks 84, i.e., to the horizontal plane of the axis of the threaded bore of the nut, and is provided with a semicircular opening 88 of a diameter slightly greater than that of said bore so as to permit the free passage therethrough of the threaded end of the bolt during the assembling operation.

The construction and driving mechanism of nut spinning chuck 33 are best illustrated in Figs. 4–6, 10 and 11, and will now be described with reference to said figures using the terms "front," "forward," "rear," etc., in a directional sense opposite to that in which the same terms have been used in describing the other elements of the apparatus. In the form shown, the body of the chuck is substantially cylindrical in outer configuration and is provided internally with a threaded bore 89 extending inwardly from the rear end of the body, a nut receiving frusto-conical recess 90 extending inwardly from the front end of the body, and a smooth cylindrical bore 91 of a diameter slightly larger than that of the bolts to be assembled extending through the central portion of the chuck body from the base of threaded bore 89 to the base of conical recess 90. Chuck 33 is mounted on the enlarged forward end portion 92 of a spinning shaft 93 which is threaded into bore 89, shaft 93 being rotatably supported by suitable bearings 94 in a housing 95 mounted on and fixed to base plate 21 at the end thereof which overhangs chute 27. Shaft 93 is adapted to be rotated continuously during the time that the machine is in use by an electric motor 96 which is supported on a bracket 97 fixed to framework 22 and drives shaft 93 through a belt 98, a sheave 99 on the motor shaft and a similar sheave 100 fixed to the rear end of shaft 93. As indicated in Figs. 4 and 5, motor 96 may be offset horizontally as well as vertically with respect to shaft 93, and its sheave 99 may be provided with a pair of belt grooves, so that the motor may be used to drive simultaneously the nut spinning chucks of two identical nut and bolt assembling mechanisms arranged side by side on the same framework.

In order to properly position the nut in chuck 33 for spinning thereby and to center the nut with the bolt as the assembling operation begins, the chuck is provided with a centering pin 101 slidably mounted in smooth bore 91 and having a reduced front end portion 102, of a diameter slightly less than that of the threaded bore of the nut, which normally projects outwardly beyond the open end of conical recess 90. The rear end of centering pin 101 extends into a cylindrical recess 103 formed in the forward end portion 92 of spinning shaft 93 and is provided with an enlarged head 104 between which and the base of recess 103 is interposed a compression spring 105 adapted to normally maintain the centering pin in the forward position illustrated in Figs. 4, 12 and 14. Abutment of head 104 against the base of internally threaded bore 89 of the chuck body limits the outward movement of the centering pin under the force of spring 105.

Although the frictional engagement between the conical surface of chuck recess 90 and the front corners of a nut which is moved into the chuck might be adequate to transmit the spinning action of the chuck to the nut, a more positive gripping action may be provided by forming in the conical surface of recess 90 a plurality of radially extending V-shaped grooves 106, equally spaced circumferentially and corresponding in number to the number of corners on the nuts to be handled (six in the embodiment illustrated wherein the nuts are of hexagonal form).

The electro-pneumatic means by which the movements of bolt slide 34 are controlled are shown schematically in Figs. 15 and 16, while the structural arrangement of certain of the elements appears in Fig. 5. As indicated in Fig. 15, the operation of cylinder 35 whose piston rod 36 moves slide 34 is controlled by a solenoid actuated, four-way valve 107 which has connected thereto a line 108 for supplying air or other fluid under pressure, an exhaust line 109 and a pair of lines 110 and 111 leading to the opposite ends of cylinder 35. Inasmuch as it is necessary to accurately control the speed at which slide 34 is moved by cylinder 35, each of air lines 110 and 111 is provided with an adjustable flow control valve 112 of known construction which restricts the air flow in one direction but permits the air to bypass the restriction in the other direction.

Valve 107 normally connects supply line 108 and exhaust line 109 to cylinder lines 110 and 111, respectively, but may be shifted so as to reverse said connections by a solenoid S1 which is energized and de-energized in a manner hereinafter described with reference to the electrical circuits of Fig. 16. The elements directly responsible for controlling solenoid S1 are an Out limit switch OLS and an In limit switch ILS, which also appear in Fig. 5. As shown in the latter figure, Out limit switch OLS is adjustably mounted on base plate 21 by means of a bracket 113 in a laterally offset position to the rear of bolt slide 34, substantially opposite the front end of cylinder 35, while In limit switch ILS is similarly mounted by means of a bracket 114 in a position forward of the Out limit switch, adjacent the rear end of slide guide 46. Both limit switches are of the snap-lock type and are provided with operating levers 115 which extend into the path of movement of a switch tripping roller 116 carried by a bearing bracket 117 fixed to the rear end of an arm 118 which is secured to and extends rearwardly from bolt slide 34. It will be evident in the light of the subsequent description of the operating cycle of the apparatus of the present invention that the distance through which bolt slide 34 is moved by the action of cylinder 35, and therefore the distance to which the nuts are threaded onto the bolts, may be varied by adjusting the position of limit switch brackets 113 and 114 relative to base plate 21.

Fig. 15 also includes a schematic illustration of the means for controlling baffle plate 29 which normally occupies the inclined position indicated in Figs. 1 and 4, so as to direct the properly assembled nuts and bolts into chute 27 and basket 24, but is automatically moved into the vertical position indicated in broken lines in Fig. 4 when the control system senses or detects a defective assembly or a failure to produce an assembly for any reason. As will be seen from Figs. 4, 5, 7 and 8, baffle plate 29 is welded or otherwise suitably fixed intermediate its ends to a horizontally extending shaft 119 which is journaled in a pair of bearing brackets 120 fixed to framework 22 in a position beneath and in substantially the same vertical plane as the rear end of opening 30 in base plate 21. Keyed to one end of shaft 119 is an operating lever 121 the outer end of which is pinned to a clevis 122 fixed to the outer end of the piston rod 123 of a pneumatic cylinder 124. The end of cylinder 124 opposite that from which piston rod 123 extends is pivotally mounted on a bracket 125 fixed to framework 22.

As indicated schematically in Fig. 15, the operation of cylinder 124 is controlled by a solenoid actuated, four-way valve 126 which, like valve 107, has connected thereto a line 127 for supplying air or other fluid under pressure, an exhaust line 128 and a pair of lines 129 and 130 leading to the opposite ends of cylinder 124, and which normally connects supply and exhaust lines 127 and 128 to cylinder lines 129 and 130, respectively. Valve 126 is shiftable by a solenoid S2 which is energized and de-energized by a Reject timer or time delay relay RT in the manner hereinafter described with reference to the electrical circuits of Fig. 16. In order to enable adjustment of the speed of movement of piston rod 123 of cylinder 124, and hence the speed at which baffle plate 29 moves from one position to the other, cylinder lines 129 and 130 may be provided with suitable flow control valves 131 similar to those associated with valve 107 and cylinder 35.

The electrical system for automatically controlling operation of the apparatus of the present invention, shown schematically in Fig. 16, will be readily understood upon consideration of the circuits therein illustrated in the light of the foregoing description and the following resume of the operating cycle.

Assuming that the machine is at rest with the parts in the positions indicated in Figs. 4, 5, 7, 8 and 12, and that bolt magazine 31 and nut magazine 32 contain adequate supplies of bolts and nuts, respectively, the sequence of operations by which a nut and a bolt are properly assembled, hereinafter referred to as the "Normal Cycle," comprises the following steps:

(1) The operator first energizes chuck spinning motor 96 which is controlled separately from the rest of the machine and continues to run until stopped by the operator.

(2) The operator then actuates Start push button switch PB1 (Fig. 16) which energizes Control relay CR to start the automatic cycle. Energization of Control relay CR closes its normally open contacts CR2 and thereby energizes Operating relay OR through contacts OLS1 of Out limit switch OLS which are then closed due to the engagement of switch tripping roller 116 with operating lever 115 of the Out limit switch (Fig. 5), and also establishes its own hold-in circuit through contacts CR1, the normally closed contacts of Stop push button switch PB2 and either the normally closed contacts ILS1 of the In limit switch ILS or the normally closed contacts PC1 of the predetermining counter PC depending on the position of the make-before-break contacts SCR1 and SCR2 of the Short Cycle relay SCR.

(3) Energization of Operating relay OR energizes solenoid S1 of valve 107 and Operating timer OT through contacts OR1 and OR3, respectively, and also establishes its own hold-in circuit through contacts OR2, the normally closed contacts RR1 of Reject relay RR and the normally closed contacts ILS1 of In limit switch ILS.

(4) Energization of solenoid S1 shifts valve 107 so as to supply air under pressure to cylinder 35 through line 111 and thereby start piston rod 36 and bolt slide 34 on their forward stroke.

(5) As bolt slide 34 starts forwardly, switch tripping roller 116 disengages the operating lever of Out limit switch OLS which immediately opens contacts OLS1 and closes contacts OLS2 so as to energize Short Cycle timer or time delay relay SCT.

(6) After the desired time interval for which Short Cycle timer SCT has been preset, its contacts SCT1 close and energize Short Cycle relay SCR which is provided with a set of make-before-break contacts SCR1 and SCR2, and a set of single pole, double throw contacts SCR3 and SCR4. Closure of contacts SCR1 followed by opening of contacts SCR2 transfers the hold-in circuit of Control relay CR from the normally closed contacts ILS1 of In limit switch ILS to the normally closed contacts PC1 of a predetermining counter PC which, as indicated in Figs. 1–4, may be mounted in any desired position wherein it is accessible to the machine operator. This counter, which may be of any suitable type, such as the Model SP "Productimeter" manufactured by Durant Manufacturing Company, is adapted to count the number of nut and bolt assemblies made by the machine and to automatically stop the machine after a predetermined, preset number of such assemblies have been made. Actuation of the single pole, double throw contacts SCR3 and SCR4 of Short Cycle relay SCR transfers the circuit controlled by the normally open contacts ILS2 of In limit switch ILS from Reject relay RR to predetermining counter PC.

On the forward stroke of piston rod 36, bolt slide 34 moves out from under bolt magazine 31 carrying with it the bolt which had been the lowermost one in the magazine, the head of the bolt being engaged by shoulder 53 of slide insert block 52 and the shank of the bolt resting in the V groove 50 of tongue portion 49, as indicated in Fig. 12. At the beginning of the forward movement of the slide, the remaining bolts in the magazine are maintained in the inclined positions shown in Fig. 12, with their heads supported initially by the head of the lowermost bolt carried by the slide and subsequently by the upper surface of the portion of the slide to the rear of shoulder 53, while their threaded portions are held in an elevated position, so as to prevent interference with the threads of the bolt carried by the slide, by a pair of horizontally extending, spring-loaded indexing pins 132.

As will be seen best in Fig. 7, each of indexing pins 132 is housed in a cylindrical guide 133 which is closed at its outer end by a cap 134 and has an open inner end extending through and fixed to one of the longitudinally extending plates 63 of the front hopper section of bolt magazine 31. Pins 132 are beveled to relatively sharp points at their inner ends, as shown in Fig. 7, and are normally urged inwardly by springs 135 interposed between the outer ends of the pins and guide caps 134 so that the beveled ends practically meet one another in the bolt passageway defined by an angle bars 60 and angle irons 64 to form a bolt support. Each of indexing pins 132 is also provided with a vertically extending spindle 136 which projects downwardly through an opening 137 in guide 133 and carries at its lower end a roller 138 located in the path of movement of one of the cam surfaces 55 which are formed on ridges 54 of bolt slide 34. When the bolt slide has carried the bolt supported thereby out from under belt magazine 31, cam surfaces 55 engage rollers 138 and move indexing pins 132 outwardly against the pressure springs 135 so as to permit the threaded portion of the then lowermost bolt in the magazine to drop down and come to rest on the horizontal surface of the rear portion of the bolt slide, in the position illustrated in Fig. 13. When, on the rearward stroke of the bolt slide, cam surfaces 55 disengage rollers 138, springs 135 are effective to return pins 132 to their original inward positions illustrated in Fig. 7 with a consequent slight elevation of the threaded portion of the next to the then lowermost bolt in the magazine and all bolts thereabove, as indicated in Fig. 14.

As bolt slide 34 moves forwardly, the threaded end of the bolt carried thereby, which projects beyond the front end of the slide, comes into abutment with the rear end of the threaded bore of the lowermost nut in nut magazine 32, which is then resting on nut supporting blocks 84 as indicated in Figs. 8 and 12, and pushes the nut off said blocks and onto the reduced end portion 102 of centering pin 101 of spinning chuck 33. The speed of forward movement of slide 34 and the horizontal distance between nut supporting blocks 84 and chuck 33 are so related that the nut is carried across the gap solely by the movement of the bolt, but said speed is also so regulated by adjustment of flow control valves 112 (Fig. 15) that there is insufficient shock to damage the lead threads of the nut and bolt when they start to engage. The spring-resisted backward movement of centering pin 101 also assists in avoiding excessive shock by gradually slowing down the movement of the bolt and nut prior to abutment of the nut against the conical surface of recess 90 in chuck 33. When the nut has been seated in recess 90 with its corners engaged in grooves 106 and takes up the rotational movement of the chuck, continued advance of bolt slide 34 under the effect of the regulated air pressure in cylinder 35 moves the threaded end of the bolt into and through the bore of the nut as the latter is rotated by the chuck and turns up on the bolt, while centering pin 101 is pushed backwardly by the end of the bolt against the pressure of spring 105.

During the threading operation, the remaining nuts in magazine 32 are supported by the upper surface of the shank of the bolt carried by slide 34, and the bolt is held in position on the slide and prevented from rotating by the engagement therewith of hold-down plate 77.

When the nut has been threaded onto the bolt the desired predetermined distance, which is controlled by the location of In limit switch ILS (Fig. 5), switch tripping roller 116 engages operating lever 115 of the In limit switch, whereupon the following operations take place:

(7) Actuation of In limit switch ILS opens its normally closed contacts ILS1 and closes normally open contacts ILS2. Opening of contacts ILS1 opens the hold-in circuit of and deenergizes Operating relay OR, which in turn opens contacts OR3 to deenergize Operating timer OT, while closure of contacts ILS2 energizes predetermining counter PC so as to register the assembled nut and bolt as a unit on the counter dial.

(8) Deenergization of Operating relay OR also opens contacts OR1 and deenergizes solenoid S1 of valve 107 which results in return of the valve to its normal position wherein cylinder lines 110 and 111 are connected to air supply and exhaust lines 108 and 109, respectively, and reversal of the direction of movement of piston rod 36 and bolt slide 34.

On the rearward stroke of piston rod 36 and bolt slide 34, the slide pulls the assembled bolt and nut out of the spinning chuck 33 and permits centering pin 101 to be returned to its normal outwardly projecting position by spring 105. When the assembly has been moved back to the position indicated in Fig. 14, where the rear face of the nut on the bolt comes into abutment with the front face of the then lowermost nut in magazine 32 which is riding on the shank of the bolt, further rearward motion of the assembly is prevented, since rear wall 81 of the magazine effectively prevents any rearward movement of the lowermost nut therein. Continued rearward movement of bolt slide 34 then causes it to slide out from under the nut and bolt assembly and permits the latter to drop downwardly through the openings 48 and 30 in slide guide 46 and base plate 21, respectively, onto baffle plate 29 by which it is deflected into chute 27 and collecting basket 24. When the assembly drops, the portion of the bolt shank immediately behind the nut passes downwardly through the space between the inner edges of nut supporting blocks 84 and thereupon permits the lowermost nut in the magazine to drop down onto the blocks so as to be properly positioned for the next assembly.

As the bolt slide continues to move rearwardly, its cam surfaces 55 release rollers 138 and permit indexing pins 132 to return to their original inward positions wherein they engage and elevate the threaded end of the next to the lowermost bolt in the bolt magazine, as previously described. At the end of the rearward stroke of piston rod 36 and bolt slide 34, the lowermost bolt in the magazine drops into horizontal position on insert block 52 and tongue portion 49 of the slide, and switch tripping roller 116 against actuates Out limit switch OLS to close its contacts OLS1 and open contacts OLS2, thereby conditioning the control system for the next cycle.

After the "Normal Cycle" has been completed a predetermined number of times, as set by the predetermining counter PC, the normally closed contacts PC1 of the counter are opened to deenergize Control relay CR and stop the machine, while normally open contacts PC2 are closed so as to energize a signal light L (Fig. 16) which informs the machine operator that the basket 24 contains the predetermined number of properly assembled nuts and bolts. Basket 24 is then moved along conveyor 23 to the shipping department and an empty basket moved up into place beneath chute 27, predetermining counter PC is reset, and the machine is again started by actuation of Start push button PB1.

The Operating timer OT referred to above in steps 3 and 7 of the "Normal Cycle" controls the maximum period of time during which piston rod 36 and bolt slide 34 may be urged in a forward direction by the pressure fluid supplied to cylinder 35 through line 111, and is adapted to reverse the movement of said piston and slide if, at the end of a predetermined time interval, the slide has not moved forwardly sufficiently far to actuate In limit switch ILS. For example, if the nut does not turn up on the bolt at all because the threads of the two members fail to engage, or if it does not screw onto the bolt the desired predetermined distance because of faulty or tight threads, the nut will either turn with spinning chuck 33 against the extreme end of the bolt or, after partially threading onto the bolt, slip inside the conical recess 90 of the chuck, and the bolt slide 34 will not advance to the normal limit of its forward travel so as to actuate In limit switch ILS. Under such conditions, Operating timer OT will permit the slide to hold the nut in spinning chuck 33 for a time interval slightly longer than that normally required to thread the nut onto the bolt the desired predetermined distance, and will then function in the manner described in the following resume of the sequence of operations which may be referred to as the "Reject Cycle":

(1) The initial steps of the "Reject Cycle" are the same as steps 2 through 6 of the "Normal Cycle" described above.

(2) If the normal forward stroke of piston rod 36 and bolt slide 34 is not completed so as to actuate In limit switch ILS within the time interval for which Operating timer OT is preset, the timer functions at the end of said interval to close contacts OT1 and energize Reject relay RR. Energization of Reject relay RR closes contacts RR3 to energize Reject timer RT, deenergizes Operating relay OR by opening normally closed contacts RR1 of the Operating relay hold-in circuit, opens the circuit to predetermining counter PC at contacts RR4, and establishes its own hold-in circuit through contacts RR2 and contacts OLS2 of Out limit switch OLS which are closed as soon as the bolt slide starts its forward movement.

(3) Energization of Reject timer RT immediately closes contacts RT2 to energize solenoid S2 of valve 126, and also opens normally closed contacts RT1 to break the circuit between contacts OLS1 of Out limit switch OLS and Operating relay OR, deenergization of Operating relay OR resulting in opening of contacts OR1 and deenergization of solenoid S1 of valve 107 which reverses the movement of piston rod 36 and bolt slide 34. When solenoid S2 of valve 126 is energized, the valve is shifted so as to connect lines 130 and 129 to supply line 127 and exhaust line 128, respectively, and thereby move the piston of cylinder 124 upwardly to retract piston rod 123 from the position shown in Fig. 4 and swing baffle plate 29 from its normal inclined position to the vertical position indicated in broken lines in Fig. 4. With the baffle plate in vertical position, the rejected nut and bolt may drop directly through openings 48 and 30 and chute 28 into reject collecting basket 26 on conveyor 25 (see Figs. 1–3).

If the nut has been partially threaded onto the bolt, the two elements are rejected from the machine as a unit in the same manner as that above described in connection with the "Normal Cycle." If, however, the nut threads have not engaged those of the bolt at all, rearward movement of bolt slide 34 retracts the bolt while the nut remains in spinning chuck 33, whereupon outward movement of centering pin 101 in conjunction with the spinning action of the chuck causes the nut to be ejected from the chuck and drop out of the machine into basket 26. Rearward movement of the bolt slide then carries the nutless bolt back with it until the head of the bolt abuts the forward vertical edges of lugs 74 of ejector member 72 which stop the rearward motion of the bolt and cause it to drop off slide 34 into reject basket 26 as the slide continues its rearward movement and slides out from under the bolt. The remaining steps of the "Reject Cycle" are as follows:

(4) When the bolt slide reaches the limit of its rearward stroke, it actuates Out limit switch OLS which opens contacts OLS2 and thereby deenergizes Reject relay RR and Short Cycle timer SCT.

(5) Deenergization of Reject relay RR opens contacts RR3 to deenergize Reject timer RT which is preset to actuate its own contacts RT1 and RT2 after expiration of a predetermined time interval sufficient for the rejected nut and bolt to clear the machine. Deenergization of Reject relay RR also closes contacts RR1 of the normal hold-in circuit of Operating relay OR through normally closed contacts ILS1 of In limit switch ILS (which circuit is then open at contacts OR2), and closes contacts RR4 in the circuit of predetermining counter PC.

(6) At the end of the time interval for which it has been preset, Reject timer RT opens contacts RT2 to deenergize solenoid S2 of valve 126 and thereby cause cylinder 124 to return piston rod 123 and baffle plate 29 to their normal positions, and at the same time closes contacts RT1 to energize Operating relay OR through contacts OLS1 of Out limit switch OLS which have then been closed by the return of bolt slide 34 to its rearmost position. The control circuit is now conditioned for another operating cycle.

The electrical system of the present invention also includes means for automatically stopping the machine if either bolt magazine 31 or nut magazine 32 should become empty without the knowledge of the operator, which means are in the form of a time delay relay and a circuit transfer relay above referred to as Short Cycle timer SCT and Short Cycle relay SCR, respectively. The sequence of operations when either the bolt magazine or the nut magazine is empty, which may be termed the "Short Cycle," is as follows:

(1) The initial steps of the "Short Cycle" are the same as steps 2 through 5 of the "Normal Cycle" described above.

(2) Short Cycle timer SCT is preset to close its contacts SCT1 and thereby energizes Short Cycle relay SCR after expiration of a predetermined time interval which is slightly shorter than the time required to properly assemble a nut and bolt in accordance with the "Normal Cycle." If either of the magazines is empty, cylinder 35 will move bolt slide 34 through the full distance of its forward stroke and In limit switch ILS will be actuated before expiration of the time interval for which Short Cycle timer SCT is set, i.e., while Short Cycle timer contacts SCT1 are still open and Short Cycle relay SCR is deenergized.

(3) Under these conditions, opening of the normally closed contacts ILS1 of In limit switch ILS deenergizes Control relay CR by opening its hold-in circuit through normally closed contacts SCR2 of Short Cycle relay SCR, which in turn opens contacts CR2 to deenergize Operating relay OR with a consequent reversal of the movement of piston rod 36 and bolt slide 34 as previously described.

This will bring the machine to a stop upon return of the bolt slide to its rearmost position due to the inability of Out limit switch contacts OLS1 to then reestablish the circuit of Operating relay OR because of the open circuit at contacts CR2.

(4) Closing of normally open contacts ILS2 upon actuation of In limit switch ILS energizes Reject relay RR through the normally closed contacts SCR3 of Short Cycle relay SCR, whereupon contacts RR3 of Reject relay RR close to energize Reject timer RT.

(5) Energization of Reject timer RT energizes solenoid S2 of valve 126 through closure of contacts RT2 and causes baffle plate 29 to be moved to its vertical position so as to permit rejection of the single nut or bolt in a manner similar to that described above in steps 3 through 6 of the "Reject Cycle."

After filling of the empty magazine and correction of whatever difficulty may have caused the magazine to become empty, the operator may start the machine on another operating cycle by simply actuating Start push button switch PB1.

The hold-in circuit of Control relay CR is also preferably provided with a Stop push button switch PB2 which may be manually actuated to stop the machine in the event of an emergency or whenever desired by the operator.

Although only one specific form of apparatus embodying the invention has been described and illustrated in the accompanying drawings, it will be obvious that the invention is not limited to the particular structure shown but is capable of a variety of mechanical embodiments. Various changes, which will now suggest themselves to those skilled in the art, may be made in the form, details of construction and arrangement of the mechanical parts, and in the electrical and fluid pressure means used for controlling various elements of the apparatus, without departing from the spirit of the invention. Reference is therefore to be had to the appended claims for a definition of the limits of the invention.

What is claimed is:

1. A machine for automatically assembling nuts and bolts comprising means for holding and rotating a nut with its axis in a horizontal position for assembly with a non-rotating bolt, horizontally reciprocable bolt carrying means, a bolt magazine for feeding bolts to said bolt carrying means, pneumatic pressure actuated means for moving said bolt carrying means toward and away from said nut holding and rotating means, means for preventing movement of the bolt relative to the bolt carrying means while said bolt is being carried toward said nut holding and rotating means, a nut magazine for feeding nuts to a position in the path of movement of said bolt carrying means adjacent to but separated horizontally by an open space from said nut holding and rotating means, the distance between said position and said nut holding and rotating means exceeding the axial thickness of the nut and the speed of movement of said bolt carrying means toward said nut holding and rotating means being so related to said distance that a nut in said position is transferred from said nut magazine to said nut holding and rotating means by abutment against the nut by the threaded end of the bolt carried by said bolt carrying means, the nut being supported during said transfer solely by the threaded end of the bolt, means for so controlling said pneumatic pressure actuated means that said bolt carrying means is normally urged yieldably toward said nut holding and rotating means until the nut has been threaded onto the bolt a predetermined distance and is then reversed in its direction of movement to withdraw the assembled nut and bolt from said nut holding and rotating means, and means for discharging the assembled nut and bolt from the machine along a predetermined path.

2. A machine for automatically assembling nuts and bolts comprising means for holding and rotating a nut with its axis in a horizontal position for assembly with a non-rotating bolt, horizontally reciprocable bolt carrying means, a bolt magazine for feeding bolts to said bolt carrying means, pneumatic pressure actuated means for moving said bolt carrying means toward and away from said nut holding and rotating means, a nut magazine for feeding nuts to a position adjacent to but spaced horizontally from said nut holding and rotating means in the path of movement of said bolt carrying means, the distance between said position and said nut holding and rotating means and the speed of movement of said bolt carrying means toward said nut holding and rotating means being so related that a nut in said position is transferred from said nut magazine to said nut holding and rotating means by abutment against the nut by the threaded end of the bolt carried by said bolt carrying means, the nut being supported during said transfer solely by the threaded end of the bolt, means for so controlling said pneumatic pressure actuated means that said bolt carrying means is normally urged toward said nut holding and rotating means until the nut has been threaded onto the bolt a predetermined distance and is then reversed in its direction of movement to withdraw the assembled nut and bolt from said nut holding and rotating means, and means for discharging the assembled nut and bolt from the machine along a predetermined path, said nut magazine being so arranged that the nuts are fed to said position by gravity and, during the time when the nut and bolt are being assembled, the lowermost nut then in the magazine rests on said bolt, the lower end of said magazine including a wall perpendicular to and terminating closely adjacent the path of movement of said bolt and preventing movement of said lowermost nut in a direction away from said nut holding and rotating means, whereby, upon completion of the assembly and withdrawal thereof from the nut holding and rotating means, said lowermost nut forms a stop for the nut of said assembly and causes the assembly to drop off said bolt carrying means as the latter moves away from said nut holding and rotating means.

3. A nut and bolt assembling machine as defined in claim 5 including means operative during movement of the bolt carrying means away from the nut holding and rotating means for ejecting from said bolt carrying means the bolt carried thereby in the event of a failure of the machine to produce an assembled nut and bolt.

4. A nut and bolt assembling machine as defined in claim 5 including means operative during movement of the bolt carrying means away from the nut holding and rotating means for ejecting from said nut holding and rotating means the nut held therein in the event of a failure of the machine to produce an assembled nut and bolt.

5. A machine for automatically assembling nuts and bolts comprising means for holding and rotating a nut with its axis in a horizontal position for assembly with a non-rotating bolt, horizontally reciprocable bolt carrying means, a bolt magazine for feeding bolts to said bolt carrying means, pneumatic pressure actuated means for moving said bolt carrying means toward and away from said nut holding and rotating means, a nut magazine for feeding nuts to a position adjacent to but spaced horizontally from said nut holding and rotating means in the path of movement of said bolt carrying means, the distance between said position and said nut holding and rotating means and the speed of movement of said bolt carrying means toward said nut holding and rotating means being so related that a nut in said position is transferred from said nut magazine to said nut holding and rotating means by abutment against the nut by the threaded end of the bolt carried by said bolt carrying means, the nut being supported during said transfer solely by the threaded end of the bolt, means for so controlling said pneumatic pressure actuated means that said bolt carrying means is normally urged toward said nut holding and rotating means until the nut has been threaded onto the bolt a predetermined distance and is then reversed in its direction of movement to withdraw the properly assembled nut and bolt from said nut holding and rotating means, means for discharging the properly assembled nut and bolt from the machine along a predetermined path, electrical timing means operative to reverse the direction of movement of said bolt carrying means after a predetermined period of time has elapsed following initiation of the movement of said bolt carrying means toward said nut holding and rotating means, which period is in excess of that normally required to thread the nut onto the bolt the predetermined distance, whereby the bolt carrying means is caused to move away from said nut holding and rotating means in the event of a failure of a nut and a bolt to assemble properly, and means controlled by said electrical timing means for providing a path of discharge for the improperly assembled nut and bolt different from the discharge path of a properly assembled nut and bolt.

6. A machine for automatically assembling nuts and bolts comprising means for holding and rotating a nut with its axis in a horizontal position for assembly with a non-rotating bolt, horizontally reciprocable bolt carrying means, a bolt magazine for feeding bolts to said bolt carrying means, pneumatic pressure actuated means for moving said bolt carrying means toward and away from said nut holding and rotating means, a nut magazine for feeding nuts to a position adjacent to but spaced horizontally from said nut holding and rotating means in the path of movement of said bolt carrying means, the distance between said position and said nut holding and rotating means and the speed of movement of said bolt carrying means toward said nut holding and rotating means being so related that a nut in said position is transferred from said nut magazine to said nut holding and rotating means by abutment against the nut by the threaded end of the bolt carried by said bolt carrying means, the nut being supported during said transfer solely by the threaded end of the bolt, means for so controlling said pneumatic pressure actuated means that said bolt carrying means is normally urged toward said nut holding and rotating means until the nut has been threaded onto the bolt a predetermined distance and is then reversed in tis direction of movement to withdraw the assembled nut and bolt from said nut holding and rotating means, means for discharging the assembled nut and bolt from the machine along a predetermined path, an electrical circuit comprising a relay for controlling the automatic cycle of operation of the machine, a counting device having a normally closed pair of contacts in the energizing circuit of said relay, means responsive to the movements of said bolt carrying means for actuating said counting device each time a nut is threaded onto a bolt the predetermined distance, and means controlled by said counting device for opening said contacts and thereby deenergizing said control relay when said counting device has been actuated a predetermined number of times, said means for actuating said counting device including a first pair of normally open contacts in the energizing circuit of said device which are closed only when said bolt carrying means has moved toward said nut holding and rotating means a distance sufficient to thread the nut onto the bolt the predetermined distance, a second pair of normally open contacts in the energizing circuit of said counting device, and timing means operative to close said second pair of contacts only after a predetermined period of time has elapsed following initiation of the movement of said bolt carrying means toward said nut holding and rotating means, which period is slightly shorter than that normally required to thread the nut onto the bolt the predetermined distance.

7. A machine for automatically assembling nuts and bolts comprising means for holding and rotating a nut with its axis in a horizontal position for assembly with a non-rotating bolt, horizontally reciprocable bolt carrying means, a bolt magazine for feeding bolts to said bolt carrying means, pneumatic pressure actuated means for moving said bolt carrying means toward and away from said nut holding and rotating means, a nut magazine for feeding nuts to a position adjacent to but spaced horizontally from said nut holding and rotating means in the path of movement of said bolt carrying means, the distance between said position and said nut holding and rotating means and the speed of movement of said bolt carrying means toward said nut holding and rotating means being so related that a nut in said position is transferred from said nut magazine to said nut holding and rotating means by abutment against the nut by the threaded end of the bolt carried by said bolt carrying means, the nut being supported during said transfer solely by the threaded end of the bolt, means for so controlling said pneumatic pressure actuated means that said bolt carrying means is normally urged toward said nut holding and rotating means until the nut has been threaded onto the bolt a predetermined distance and is then reversed in its direction of movement to withdraw the assembled nut and bolt from said nut holding and rotating means, means for discharging the assembled nut and bolt from the machine along a predetermined path, an electrical system having a relay for controlling the automatic cycle of operation of the machine, and means for automatically interrupting said cycle in the event that either the bolt magazine or the nut magazine becomes empty, said last named means comprising a first circuit for energizing said relay having a normally closed pair of contacts, a second circuit for energizing said relay having a normally open pair of contacts, timing means for closing said normally open pair of contacts and energizing said relay through said second circuit after a predetermined period of time has elapsed following initiation of the movement of said bolt carrying means toward said nut holding and rotating means, which period is slightly less than that normally required to thread the nut onto the bolt the predetermined distance, and means responsive to the movements of said bolt carrying means for opening said normally closed contacts when said bolt carrying means has moved toward said nut holding and rotating means a distance sufficient to thread the nut onto the bolt a predetermined distance in a period of time less than the delay period of said timing means.

8. In a machine for automatically assembling nuts and bolts, the combination of a chuck for holding and rotating a nut with its axis in a horizontal position for assembly with a non-rotating bolt, a horizontally reciprocable slide for carrying a bolt toward and away from said chuck, a bolt magazine for feeding bolts to said slide, means for preventing movement of the bolt relative to the slide while said bolt is being carried toward said chuck, a nut magazine for feeding nuts to a position in the path of movement of said slide adjacent to but separated horizontally by an open space from said chuck, the distance between said position and said chuck exceeding the axial thickness of the nut and the speed of movement of said slide toward said chuck being so related to said distance that a nut in said position is transferred from said nut magazine into said chuck by abutment against the nut by the threaded end of the bolt carried by said slide, the nut being supported during said transfer solely by the threaded end of the bolt, means actuated entirely by pneumatic pressure for moving said slide toward and away from said chuck and through said slide yieldably urging the threaded end of the bolt carried thereby into the threaded bore of the nut after the latter has been transferred into said chuck, and means responsive to the movements of said slide for controlling the supply of pressure air to said slide moving means.

9. In a machine for automatically assembling nuts and bolts, the combination of a chuck for holding and rotating a nut with its axis in a horizontal position for assembly with a non-rotating bolt, a horizontally reciprocable slide for carrying a bolt toward and away from said chuck, a bolt magazine for feeding bolts to said slide, means for preventing movement of the bolt relative to the slide while said bolt is being carried toward said chuck, a nut magazine for feeding nuts to a position in the path of movement of said slide adjacent to but separated horizontally by an open space from said chuck, the distance between said position and said chuck exceeding the axial thickness of the nut and the speed of movement of said slide toward said chuck being so related to said distance that a nut in said position is transferred from said nut magazine into said chuck by abutment against the nut by the threaded end of the bolt carried by said slide, the nut being supported during said transfer solely by the threaded end of the bolt, means actuated entirely by pneumatic pressure for moving said slide toward and away from said chuck and through said slide yieldably urging the threaded end of the bolt carried thereby into the threaded bore of the nut after the latter has been transferred into said chuck, and electrical means for controlling the supply of pressure air to said slide moving means, said electrical means including a pair of limit switches adapted to be actuated by said slide at predetermined positions during its movement to cause reversals of the direction of said movement.

10. In a machine for automatically assembling nuts and bolts having a chuck for holding and rotating a nut for assembly with a non-rotating bolt and a reciprocable slide for carying a bolt toward and away from said chuck, the combination therewith of means actuated entirely by pneumatic pressure for moving said slide toward and away from said chuck and through said slide yieldably urging the thread of the bolt carried thereby into the threaded bore of the nut while the latter is held and rotated by said chuck, and electrical means for controlling the supply of pressure air to said slide moving means, said electrical means including a limit switch adapted to be actuated by said slide when the latter reaches a predetermined position during its movement toward the chuck and operative upon actuation to cause a reversal of the direction of said movement, and electrical timing means operative independently of said limit switch to cause a reversal of the direction of said movement after a predetermined period of time has elapsed following energization of said timing means, means for energizing said timing means when said slide begins to move toward said chuck, and means operable upon actuation of said limit switch for deenergizing said electrical timing means.

11. A machine for automatically assembling nuts and bolts comprising a chuck rotatable about a horizontal axis for holding and turning a nut onto a non-rotating bolt, a horizontally reciprocable bolt carrying slide for supporting a bolt in axial alignment with said chuck, and for carrying the bolt toward and away from said chuck, a bolt magazine for feeding bolts to said slide, means for preventing movement of the bolt relative to the slide while said bolt is being carried toward said chuck, a stationary nut support positioned in the path of movement of said slide adjacent to but separated horizontally by an open space from said chuck and so constructed and arranged as to support a nut with its threaded bore in axial alignment with the bolt and the chuck, a nut magazine for feeding nuts to said support by gravity, the distance between said nut support and said chuck exceeding the axial thickness of the nut and the speed of movement of said slide being so related to said distance that the nut is transferred from said support into said chuck by abutment against the nut by the threaded end of the bolt, the nut being supported during said transfer solely by the threaded end of the bolt, and means actuated entirely by pneumatic pressure for moving said slide forwardly toward and rearwardly away from said chuck and through said slide yieldably urging the threaded end of the bolt carried thereby into the threaded bore of said nut after the latter has been transferred into said chuck.

12. A machine for automatically assembling nuts and bolts comprising a chuck rotatable about a horizontal axis for holding and turning a nut onto a non-rotating bolt, a horizontally reciprocable bolt carrying slide for supporting a bolt in axial alignment with said chuck, a bolt magazaine for feeding bolts to said slide, a stationary nut support positioned in the path of movement of said slide adjacent to but spaced horizontally from said chuck and so constructed and arranged as to support a nut with its threaded bore in axial alignment with the bolt and the chuck, a nut magazine for feeding nuts to said support, the distance between said nut support and said chuck and the speed of movement of said slide being so related that the nut is transferred from said support into said chuck by abutment against the nut by the threaded end of the bolt, the nut being supported during said transfer solely by the threaded end of the bolt, means actuated entirely by pneumatic pressure for moving said slide forwardly toward and rearwardly away from said chuck and through said slide yieldably urging the threaded end of the bolt carried thereby into the threaded bore of said nut after the latter has been transferred into said chuck, a base plate for supporting said chuck, slide, bolt magazine, nut support and nut magazine having an opening therein through which nuts and bolts are adapted to drop for discharge from the machine during the rearward movement of said slide away from said chuck, a baffle plate beneath said opening normally positioned to direct properly assembled nuts and bolts along a predetermined discharge path, and means including an electrical time delay relay operative to move said baffle plate to another position after a predetermined period of time has elapsed following initiation of the movement of said slide toward said chuck, which period is in excess of that normally required to thread the nut onto the bolt the predetermined distance, whereby said baffle plate is moved out of its normal position in the event of a failure of a nut and a bolt to assemble properly and thereby directs improperly assembled nuts and bolts along a different discharge path.

13. A machine for automatically assembling nuts and bolts comprising a chuck rotatable about a horizontal axis for holding and turning a nut onto a non-rotating bolt, a horizontally reciprocable bolt carrying slide for supporting a bolt in axial alignment with said chuck, a bolt magazine for feeding bolts to said slide, a stationary nut support positioned in the path of movement of said slide adjacent to but spaced horizontally from said chuck and so constructed and arranged so as to support a nut with its threaded bore in axial alignment with the bolt and the chuck, a nut magazine for feeding nuts to said support, the distance between said nut support and said chuck and the speed of movement of said slide being so related that the nut is transferred from said support into said chuck by abutment against the nut by the threaded end of the bolt, the nut being supported during said transfer solely by the threaded end of the bolt, means actuated entirely by pneumatic pressure for moving said slide forwardly toward and rearwardly away from said chuck and through said slide yieldably urging the threaded end of the bolt carried thereby into the threaded bore of said nut after the latter has been transferred into said chuck, a base plate for supporting said chuck, slide, bolt magazine, nut support and nut magazine having an opening therein through which nuts and bolts are adapted to drop for discharge from the machine during the rearward movement of said slide away from said chuck, a baffle plate beneath said opening normally positioned to direct properly assembled nuts and bolts along a predetermined discharge path, fluid pressure actuated means for moving said baffle plate to another position wherein improperly assembled nuts and bolts may be directed along a different discharge path, and electrical timing means operative to actuate said fluid pressure actuated means and thereby move said baffle plate to said other position after a predetermined period of time has elapsed following initiation of the movement of said slide toward said chuck, which period is in excess of that normally required to thread the nut onto the bolt the predetermined distance.

14. A machine for automatically assembling nuts and bolts comprising a chuck rotatable about a horizontal axis for holding and turning a nut onto a non-rotating bolt, a horizontally reciprocable bolt carrying slide for supporting a bolt in axial alignment with said chuck, a bolt magazine for feeding bolts to said slide, a stationary nut support positioned in the path of movement of said slide adjacent to but spaced horizontally from said chuck and so constructed and arranged as to support a nut with its threaded bore in axial alignment with the bolt and the chuck, a nut magazine for feeding nuts to said support, the distance between said nut support and said chuck and the speed of movement of said slide being so related that the nut is transferred from said support into said chuck by abutment against the nut by the threaded end of the bolt, the nut being supported during said transfer solely by the threaded end of the bolt, means actuated entirely by pneumatic pressure for moving said slide forwardly toward and rearwardly away from said chuck and through said slide yieldably urging the threaded end of the bolt carried thereby into the threaded bore of said nut after the latter has been transferred into said chuck, and a base plate for supporting said chuck, slide, bolt magazine, nut support and nut magazine having an opening therein through which nuts and bolts are adapted to drop for discharge from the machine during the rearward movement of said slide away from said chuck, said nut magazine being so constructed and arranged that, during the time when the nut and bolt are being assembled, the lowermost nut then in the magazine rests on said bolt, the lower end of said magazine including a wall perpendicular to and terminating closely adjacent the path of movement of said slide and preventing movement of said lowermost nut in a direction away from said chuck, whereby, when the slide moves rearwardly away from the chuck with an assembled nut and bolt supported thereon, the lowermost nut then in said magazine engages the nut of the assembly and stops its rearward movement, thereby causing said assembly to drop off the slide through the opening in said base plate as the slide continues its rearward movement.

15. An automatic nut and bolt assembling machine as defined in claim 14 including means operative during the rearward movement of said slide for ejecting from said slide into the opening in said base plate any bolt on which a nut has failed to thread.

16. An automatic nut and bolt assembling machine as defined in claim 14 wherein said chuck includes means for ejecting therefrom into the opening in said base plate any nut which fails to thread onto the bolt carried by said slide.

17. In an automatic nut and bolt assembling machine of the character described, the combination of a chuck rotatable about a horizontal axis for holding and rotating a nut for assembly with a non-rotating bolt, a horizontally reciprocable bolt slide for supporting a bolt in axial alignment with said chuck and for carrying the bolt toward and away from said chuck, pneumatic pressure actuated means for moving said slide forwardly toward and rearwardly away from said chuck, means for preventing movement of the bolt relative to the slide while said bolt is being carried toward said chuck, a stationary nut support positioned in the path of movement of said slide adjacent to but separated horizontally by an open space from said chuck and so constructed and arranged as to support a nut with its threaded bore in axial alignment with the bolt and the chuck, a nut magazine for feeding nuts to said support by gravity, the distance between said nut support and said chuck exceeding the axial thickness of the nut and the speed of movement of said slide being so related to said distance that the nut is transferred from said support into said chuck by abutment against the nut by the threaded end of the bolt, the nut being supported during said transfer solely by the threaded end of the bolt, means for controlling the operation of said slide moving means including a pair of limit switches adjustably positioned to define the limits of the forward and rearward movement of said slide, and means carried by said slide for actuating said limit switches.

18. In a machine for automatically assembling nuts and bolts having a chuck for holding and rotating a nut for assembly with a bolt and a reciprocable slide for carrying a bolt toward and away from said chuck, the combination therewith of means actuated entirely by pneumatic pressure for moving said slide toward and away from said chuck and through said slide yieldably urging the threaded end of the bolt carried thereby into the threaded bore of the nut while the latter is held and rotated by said chuck, and electrical means for automatically controlling the supply of pressure air to said slide moving means, said electrical means including a limit switch adapted to be actuated by said slide when the latter reaches a predetermined position during its movement toward the chuck to cause a reversal of the direction of said movement, means forming a normally closed path for discharging improperly assembled nuts and bolts from the machine, and means including an electrical time relay for opening said path in the event that said limit switch is not actuated within a predetermined interval of time after the slide begins to move toward said chuck.

19. In a machine for automatically assembling nuts and bolts having a chuck for holding and rotating a nut for assembly with a bolt and a reciprocable slide for carrying a bolt toward and away from said chuck, the combination therewith of means actuated entirely by pneumatic pressure for moving said slide toward and away from said chuck and through said slide yieldably urging the threaded end of the bolt carried thereby into the threaded bore of the nut while the latter is held and rotated by said chuck, and electrical means for automatically controlling the supply of pressure air to said slide moving means, said electrical means including a limit switch adapted to be actuated by said slide when the latter reaches a predetermined position during its movement toward the chuck to cause a reversal of the direction of said movement, means forming a normally closed path for discharging improperly assembled nuts and bolts from the machine, and means including an electrical time relay for opening said path in the event that said limit switch is actuated prior to the expiration of a predetermined interval of time after the slide begins to move toward said chuck.

20. In an automatic nut and bolt assembling machine of the character described, the combination of a horizontally reciprocable bolt slide having a body portion, a forwardly projecting tongue portion adapted to support the shank of a bolt with the threaded end of said shank extending forwardly of the end of said tongue portion, said tongue portion being of substantially the same width as the diameter of the bolt, and a removable insert block adapted to support the head of the bolt, said block including a vertically extending shoulder against which the bolt head is adapted to abut during forward movement of the slide, a stationary guide member for supporting and guiding the movement of the body portion of said slide, and means for supporting a nut with its threaded bore in axial alignment with the shank of a bolt supported on said bolt slide, said nut supporting means comprising a pair of blocks spaced transversely of the path of movement of said slide by a distance sufficient to permit the passage therebetween of the tongue portion of said slide.

References Cited in the file of this patent

UNITED STATES PATENTS

| | | |
|---|---|---|
| 613,635 | Lisle | Nov. 1, 1898 |
| 968,889 | Smith | Aug. 30, 1910 |
| 1,389,916 | Thomas | Sept. 6, 1921 |
| 1,742,173 | Bates | Dec. 31, 1929 |
| 1,906,078 | Morgan | Apr. 25, 1933 |
| 2,046,520 | Lundell | July 7, 1936 |
| 2,324,727 | Shartle | July 20, 1943 |
| 2,326,498 | Rodal | Aug. 10, 1943 |
| 2,425,124 | Ray | Aug. 5, 1947 |
| 2,428,640 | Smith | Oct. 7, 1947 |
| 2,526,441 | Whitmore | Oct. 17, 1950 |
| 2,621,346 | Jacobson | Dec. 16, 1952 |
| 2,673,686 | Hoffmann | Mar. 30, 1954 |
| 2,777,425 | Adams | Jan. 15, 1957 |
| 2,831,524 | Bache | Apr. 22, 1958 |

FOREIGN PATENTS

| | | |
|---|---|---|
| 449,777 | France | Mar. 7, 1913 |
| 151,958 | Australia | June 18, 1953 |